April 22, 1941.   R. B. FOSTER   2,238,894
AUTOMATIC AND MANUAL RADIO CONTROL APPARATUS
Filed Dec. 6, 1937   3 Sheets—Sheet 1

Fig. 1.

INVENTOR
ROBERT B. FOSTER
BY William E. Hall
ATTORNEY

Patented Apr. 22, 1941

2,238,894

UNITED STATES PATENT OFFICE 2,238,894

AUTOMATIC AND MANUAL RADIO CONTROL APPARATUS

Robert B. Foster, Los Angeles, Calif., assignor to John B. Smiley, New York, N. Y.

Application December 6, 1937, Serial No. 178,220

16 Claims. (Cl. 250—20)

My present invention relates to automatic and manual radio control apparatus, and particularly to improvements over Patent No. 2,075,809, issued April 6, 1937, for Control apparatus for radio receiving sets, and improvements over my copending patent applications, Serial No. 120,016, filed January 11, 1937, Patent 2,186,964, issued January 16, 1940, for Time control switch mechanism, and Serial No. 163,787, filed Sept. 14, 1937, for Radio starting and control switch circuit.

An important object of this invention is to provide an apparatus of this class whereby the radio set is, at all times, in condition to be turned on automatically.

An important object also is the provision of an apparatus of this class whereby the radio set may be turned on automatically directly, quickly and efficiently.

Another important object of this invention is the provision of extremely simple means whereby the radio set may be simultaneously turned on and quickly and accurately adjusted to the desired station by depressing a certain button or lever designated for the particular station.

A further important object of this invention is the provision of simple means whereby any of the broadcast stations of a broadcast band may be obtained by or with only a limited number of contacts, switches, or the like, by the manual adjustment of the contacts, switches, or the like, to correspond to or coincide with the desired station or the adjusted position of the tuning condenser.

It is a further important object of this invention to provide adjustable contacts or switches of this class which may not be easily disturbed or shifted from the desired position and further contacts or switches of this class which are self aligning for accurate or sharp tuning.

A still further object of this invention is the provision of a structure of this class whereby other contacts or switches may be easily added to increase the flexibility of the set, that is, to permit a larger number of different broadcast stations to be brought in at one setting, or to prevent frequent adjustment of the contacts or switches to different positions to correspond to the tuning condenser positions.

With these and other objects in view, as will appear hereinafter, I have devised an apparatus of this class having certain novel features of construction, and arrangement of parts and portions as will be hereinafter described in detail, and particularly set forth in the appended claims, reference being had to the accompanying drawings and to the characters of reference thereon, which form a part of this application; in which:

Figure 1:
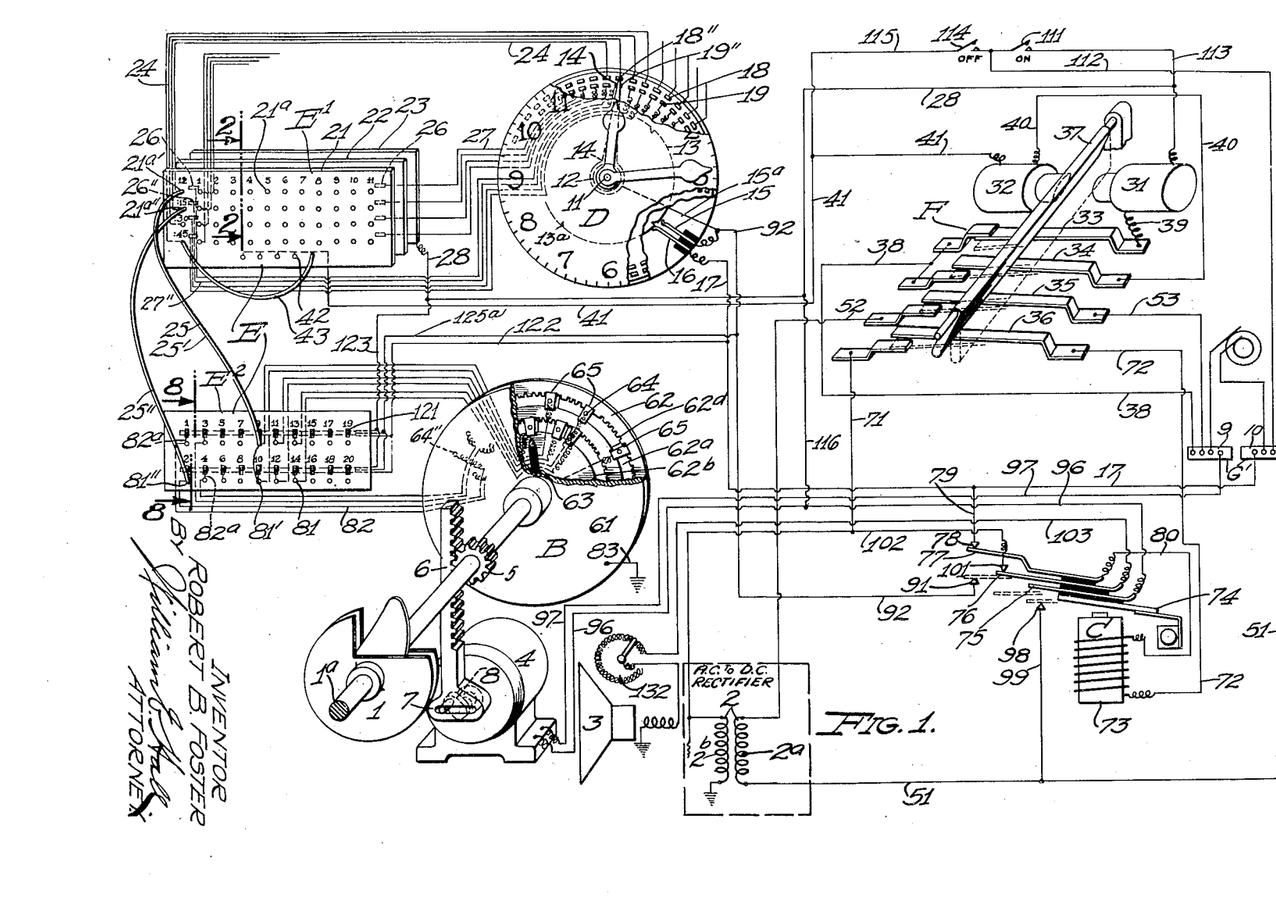
Fig. 1 is a diagrammatic view of my apparatus in a preferred form, showing some of the parts fragmentarily in elevation, and showing other parts in prespective and partly broken away to facilitate the illustration.

My automatic and manual radio control apparatus, is applied in this instance to a conventional radio receiving set A, showing, for the purpose of illustration, only a rotary variable condenser 1, a power transformer 2, and a dynamic or loud speaker 3. The shaft 1ª of the condenser, as diagrammatically illustrated, is axially aligned with and directly connected to a selective tuning means or station finder switch B. The shaft 1ª is rotated by a controlled motor 4. The operative connection consists of a gear 5 on the shaft, a rack 6 for rotating the gear, a slotted crosshead 7 at one end of the rack, and a crank 8 on the motor shaft, the free end of the crank having a pin operating in the slot of the crosshead, to reciprocate the rack as the motor rotates, as shown and described in United States Patent No. 2,075,809.

The motor, in the preferred construction, is controlled primarily by an electro-magnetic switch C at predetermined periods in accordance with a time switch element or control clock D, as indicated, designated, or directed by a switch or jack board E. The starting and control of the set or receiver, although initiated by the time switch element or control clock D, is effected primarily by a multiple switch mechanism F.

The radio receiving set, shown and described, may be connected to and operated by either alternating or direct current, but I have described the same as operated by ordinary alternating electric current, such as the conventional 110 volt domestic alternating electric current. I have shown the two leads from an alternating current generator G connected to a multiple block G', these leads being referred to, for convenience, as leads 9 and 10.

The time switch of control clock D may be an electrically operated or mechanical clock having a minute shaft 11 and an hour shaft 12. On the minute shaft is mounted a fibre disc 13 which has, at its periphery, four equal-arcuately spaced notches 13ª. On the hour shaft is mounted, but insulated therefrom, a contact arm 14. The clock frame carries a finger 15 which is connected by wire 15ª to the contact arm 14. The frame also carries an insulated resilient brush 16 which is connected, by wire 17, to the lead 10, and which normally engages the periphery of the insulating disc 13. The free end of this brush drops in succession into the notches 13ª during the rotation of the disc, and, when thus dropped into one of the notches, it engages at its free end the finger 15, until the disc 13 rotates and disengages the brush 16 from the finger 15. The clock carries, in this instance, two series of circularly arranged contacts 18 and 19. The contacts of both series are arranged in coacting pairs and the pairs are circumferentially spaced at fifteen minute intervals from each other. One series or one of each pair may be spaced axially from the other, or radially from the other, as shown.

The jack board E is divided into two parts, namely the time jack board E¹ and the broadcast station board E². The board E¹ consists of three panels 21, 22, and 23.

The board or panel 21 has spaced jacks 21ª, each of which is connected, by a wire 24, to a contact 18 on the control clock. Thus, there is one jack for each contact 18. The jacks 21ª are capable of receiving one end or plug 25ª of cords 25, these cords being interchangeable, as desired and as hereinafter more particularly set forth.

Figures 2, 3, 4, 5, 6, 7, 8, 9, 10:
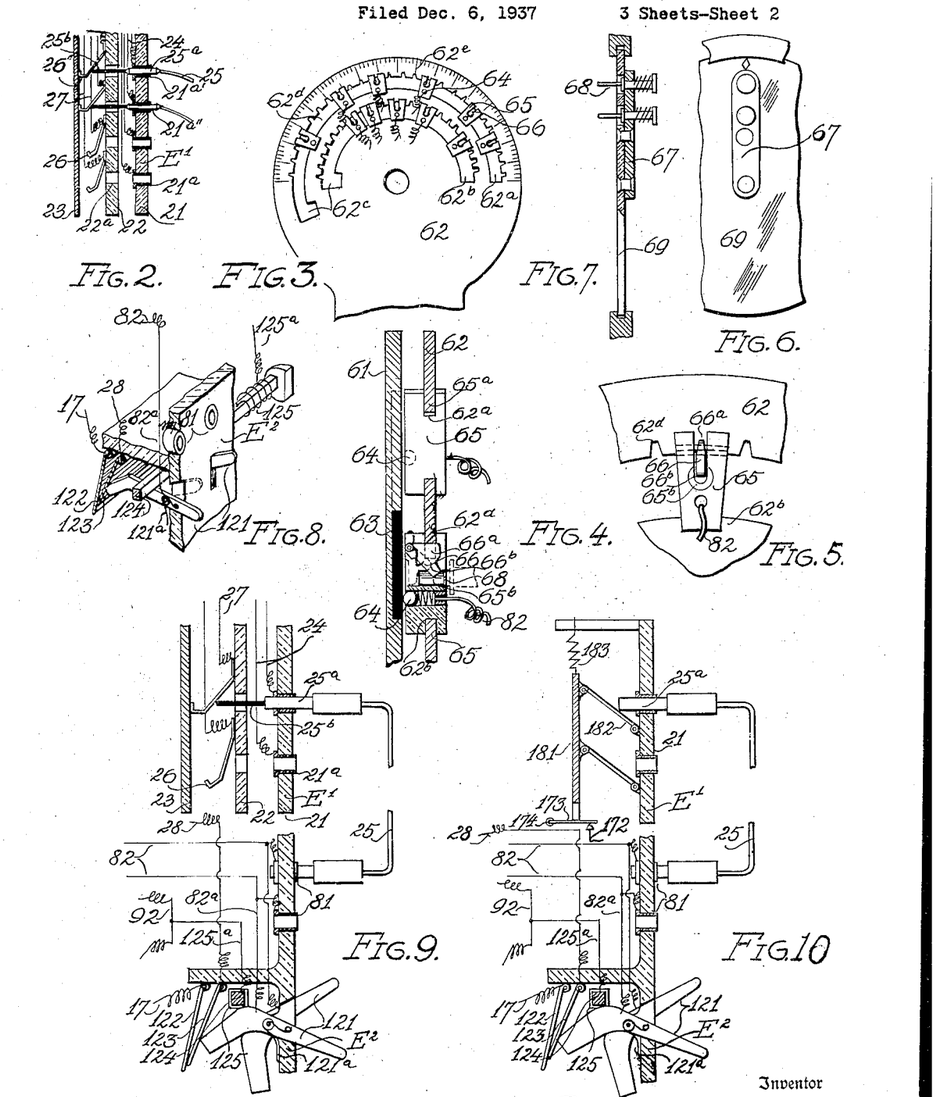
Fig. 2 is an enlarged end elevation of the time switch or jack board.
Fig. 3 is an enlarged rear elevation of the station finding or selecting switch, showing particularly the stationary member thereof.
Fig. 4 is an enlarged sectional elevation thereof.
Fig. 5 is an enlarged fragmentary elevation showing the mounting of the shiftable contacts on the stationary member of the station finder switch.
Figs. 6 and 7 are respectively fragmentary front and edge elevations of the means for adjusting the shiftable contacts.
Fig. 8 is an enlarged fragmentary perspective view of the time switch board showing diagrammatically the means for effecting manual station selection, the view being taken substantially through 8—8 of Fig. 1.
Fig. 9 is a wiring diagram of the jack or plug board, shown in Fig. 1.
Fig. 10 is a similar wiring diagram of the jack or plug board shown in Fig. 11.

The panel 22 has a multiplicity of holes 22ª, each corresponding to and aligned with a jack 21ª. At the back of the panel, as shown best in Figs. 2 and 9, is a like number of flexible band contacts 26, each being secured at one end to the panel, and extended over a hole 22ª, and each being capable of being separately distorted to engage the panel 23, which is a conducting plate. Each contact 26 is connected, by a separate wire 27, to the corresponding contact 19 on the control clock. Thus, one contact 18 of each pair of contacts is connected to a jack 21ª, while the other contact of such pair is connected to the contact 26 placed behind or over the hole 22ª which is alined with the last named or corresponding jack 21ª. The respective contact 26 is distorted or pressed against the plate 23 by an insulated portion 25ᵇ at the extreme inner end of the plug 25ª which may be inserted into the corresponding jack 21ª.

The panel or plate 23 is connected, by wire 28, to an electromagnet 31 of the multiple switch mechanism F.

This multiple switch mechanism F, illustrated, consists of spring switches 33, 34, 35, and 36, in which, when the radio receiver is off, the switch 33 is normally closed while the other switches are normally open. The condition of these switches is simultaneously reversed, that is, switch 33 is opened while the others are closed, by an operating device or rocking bar 37 which is pivoted at the opposite ends of its upper edge and is adapted to engage with its lower edge the free end of portions of the movable members of the above switches. The bar is rocked to opposite positions by the magnet 31, known as the on-magnet, and by an off-magnet 32. The former, when the radio receiver is turned on, reverses the switches from their normal positions, that is, it opens the switch 33 and closes switches 34, 35, and 36. The latter magnet 32 is the off-magnet and returns the switches, or as shown, allows the switches to return, to their normal open positions.

One end of both switches 33 and 34 is connected by wire 38 to lead 9. The other ends of both switches are connected by wires 39 and 40 respectively to one end of magnets 31 and 32.

The other end of the off-magnet 32 is connected, by wire 41 to a plurality or series of connected jacks 42. A flexible cord or cable 43 may be plugged into and connect one of the jacks 42 and 21ª.

Thus, at a particular and designated time the radio receiving set will be turned on by energizing the on-magnet 31, and it may also be turned off at a designated or predetermined time by energizing the off-magnet 32.

When the on-magnet is energized, switches 34, 35 and 36 are closed. Closing of the switch 35 energizes the primary 2ª of the transformer 2, through the wires 51, 52 and 53, exciting the secondary 2ᵇ, which energizes the receiving set A, thereby beginning reception over the broadcast station designated on the jack board E² at the time the receiving set A is turned on, providing the latter station is the same as the one at which the condenser 1 and station selecting switch B had been set at the previous reception period.

If the previous station setting is different, an additional operation takes place, namely, the setting of the condenser by the operation of the station selecting switch B by the previous operation of the electromagnetic switch C. But the operation of the latter switch C takes place through the former station selecting or finder switch B.

The selective tuning means or station finder switch B illustrated, consists essentially of a rotary disc 61 and a concentric stationary disc 62, the rotary disc 61 carrying an insulating strip 63 and the latter a plurality of electric contacts 64 insulated from each other and mounted on individual sliding blocks 65 adjustably carried by the disc 62. These contacts 64 are arcuately spaced to correspond to the broadcast station spaces on the dial (not shown) of the tuning condenser 1. The specific mounting of said contacts and blocks will be described hereafter. The contacts 64 normally and resiliently contact the disc 61, but are sequentially insulated therefrom by the insulating strip 63 as the disc 61 is rotated. The portion of the strip 63 adapted to engage the contacts 64 is narrow, presenting in substance, an edge or hairline, but it is slightly wider than the engaging ends of the contacts 64. Thus a break in the electric circuit between a particular contact 64 and the plate 61 is made. Unless the particular contact 64, corresponding to the desired condenser position or broadcast station, engages the insulating strip 63, when the radio is turned on through the on-magnet 31, the disc 61 is always connected, through one of the contacts 64, to the secondary 2$^b$ of the transformer, and thereby the magnet 73 of the electro-magnetic switch C is energized, as will be described hereafter.

The electro-magnetic switch C comprises the magnet or coil 73 and an armature 74 which carries a plurality of three flexible switch members 75, 76, and 77, insulated from each other and from the armature. The latter switch member is permanently electrically connected, that is, when the switch 36 is closed, through the coil 73 with a source of energy, which consists, in this instance, of the secondary 2$^b$ the transformer 2. When the coil 73 is deenergized, the leaf or member 77 normally engages a contact 78 which is connected by wire 79 to the wire 17 which is connected to the brush 16.

The last mentioned circuit, which energizes the magnet or coil 73, consists of the following: One terminal of the secondary is grounded; the circuit passes through the other terminal, through wire 71, switch 36, wire 72, coil 73, wire 80, contact leaf 77, contact 78, wires 79 and 17, brush 16, finger 15, switch arm 14, a particular contact 18, the corresponding wire 24 and jack 21$^a$, through the detachable cord or cable 25, connecting the particular jack 21$^a$ to the particular jack 81 on the station selecting jack board E$^2$, and thence through the wire 82 connecting the latter jack to the contact 64 which engages the disc 61, which is grounded, as indicated at 83. The cables or cords 25 are the same as ordinary switch board cables except for the ends 25, above described. The jack or switch board E$^2$ contains jacks which correspond with and are connected to the respective contacts 64 which correspond with the markings or station positions on the condenser dial.

As the magnet or coil 73 is energized through the circuit described, the armature 74 is attracted and the contact leaf 77 forced to engage a contact 91 which is directly connected, through wire 92, to the finger 15. Thus, when the brush 16 is disengaged from the finger 15 by the fibre disc 13, a holding circuit continues to pass through the coil 73 until broken by the rotation of the disc 61 and insulating strip 63, as will be described hereafter.

The flexible contact leaf or switch member 75 is connected by wire 96 to the motor 4, which is connected, by wire 97, to the lead 9. When the armature is attracted by the magnet or coil 73, the free end of the leaf 75 engages a contact 98 which is connected to the other lead 10 by wire 99. Thus, when the magnet 73 is energized, an alternating circuit to the motor 4 is closed, and the disc 61 thereby rotated until the insulating strip 63 breaks the circuit through the contact 64 which has caused the magnet 73, to be energized. Thus, when the magnet 73 is deenergized the armature 74 is allowed to return to its normal position, breaking the motor connection. Shortly after the armature 73 is attracted, the contact between the brush 16 and finger 15 is broken, preventing reestablishment of a circuit through the magnet 73 when the armature is released.

The free end of the contact leaf 76, when released by the magnet 73, engages a contact 101 which is connected by wire 102 to the wire 71 or one terminal of the secondary 2$^b$, the other end of the contact leaf 76 being connected by wire 103 to the loud speaker through a variable resistance 132. Thus, when the motor is operated the loud speaker is disconnected.

If it is desired to dispense with the automatic feature applied to the radio receiving set, I have provided a button 111 which is connected at one end, by a wire 112, to the lead 10 with the on-magnet 31, the other end being connected, by wire 113, to the wire 28. By an instant depression of the button, the on-magnet 76 is energized throwing the multiple switches to their on or reverse positions, and connecting the receiving set to the current.

With continued depression of the button 111, the condenser will be operated by the motor 4, to the desired extent, such motor operation being effected by the closing of a circuit through wires 28, 116, 96, and 97.

If it is desired to dispense with the automatic shut-off, or if it is desired to turn off the radio receiving set at any time, a button 114 is depressed. This closes a circuit, through wires 112 and 115, off-magnet 32, wire 40, switch 34, and wire 38, to the alternating current line, rocking the bar 75 and returning the multiple switches to their normal off-positions, as shown by solid lines in Fig. 1.

The station selecting switch B is constructed in a particular manner so that only a small number of contacts 64 may be employed, a number which is or may be most commonly employed. These contacts are so mounted that they may be readily shifted from place to place to turn on different stations. The structure is also so arranged that other contacts may be easily added so as to increase the flexibility and adaptability of the structure to a greatly varied program without adjustment of the station contacts.

The stationary disc 62 of this station selecting or finding switch B is provided, in this instance, with a pair of concentric arcuate slots 62$^a$ and 62$^b$, the latter positioned radially inwardly from the former, and each provided at one end with an enlarged opening 62$^c$. In the slots are slidably mounted the insulated contact carrying blocks 65. These blocks are segmental with their radially inner and outer edges provided with arcuate grooves 65$^a$ which receive the opposite edges of the slots, and thus slidably support the blocks 65. At the inner sides of the blocks are the contacts 64 which may be balls or plungers held resiliently extended from the face of the blocks and thus held in resilient engagement with the rotatable disc 61. These blocks may be automatically but removably locked into position by spring actuated levers 66. One end 66$^a$ of each lever is wedge shaped and this portion is adapted to enter a similarly shaped recess 62$^d$ at the adjacent edge of one of the slots 62$^a$ or 62$^b$. Thus, as the wedge portion enters the recess, the block is automatically and accurately aligned in the slot; and, if the recesses are aligned with and spaced to correspond with the station positions of the condenser, the particular position of the contact carried by the particular block also corresponds with a particular station position of the condenser or marking on the condenser dial.

These blocks are adapted and intended to be shifted to the position desired or most frequently used. This shifting is effected, preferably at the back or side of the radio receiving set, and by a lever 67 which is manually rotatable about an axis coincident with the axis of the disc 61. This lever has spring retractible plungers 68, one for each row of contact blocks 65. This lever may take the form of a transparent rotatable window or it may be mounted on such a window, designated 69. This window may have an index mark 69ª which may be drawn over a dial 62ᵉ on the disc 62 so as to determine station positions. This dial is calibrated as the condenser dial which is adapted to be used at the front side of the radio set, but, in this instance, is in the reverse order.

If it is desired to shift a contact block to the position desired, one of the plungers 68 is forced inwardly into the block which is nearest the desired position. For this purpose each block is provided with a transverse hole 65ᵇ which is chamfered at the outer end for the ready reception of the plunger. The free end 66ᵇ of the lever terminates in the hole 65ᵇ in such a manner that when the plunger 68 is inserted into the hole the locking lever is rocked about its axis and disengaged from the carrying disc 62 and permitted freely to be shifted to the desired position.

If two broadcast station positions on the condenser are closer than is allowed by adjacent blocks in the same slot or groove 62ª or 62ᵇ, such two broadcast station positions are determined or obtained by contacts 64 on blocks 65 arranged in radially different slots.

In order to eliminate confusion, or reduce it to a minimum, all blocks preferably carry fixed number designations which correspond with like numbers of the jacks 81 on the jack board E². Certain connected blocks and jacks may also carry certain station designations, such as ABC or XYZ. The blocks so marked are preferably shifted to the corresponding positions on the disc 62 so that, if it is desired to have such station automatically turned on, a cord, connected with the proper time jack 21ª, may be plugged into such station jack 81.

The enlarged portions 62ᶜ at the ends of the arcuate slots 62ª or 62ᵇ permit the introduction of other contact carrying blocks 65 into the slots. These newly introduced blocks are connected to separate jacks 81 on the board E². Thus, new or additional contacts may be added to the receiving set, as desired.

The push button or manual control or station selection is effected by a series of buttons or switches 121 located on the jack board E², one button in association with each jack, and the associated button and jack adapted to turn on the radio set to the same station. A preferred method of connection of the buttons is shown in Figs. 1, 8, 9, and 10. The method consists in shunting out, when desired, the clock control switch. Where the jacks 81 are arranged in horizontal rows, the buttons 121 may be placed in rows directly below. At the back of the board E², and for each row of buttons, levers or keys 121, are provided two shiftable horizontal bus bars 122 and 123, and a stationary bar magnet 124, the corresponding bus bars from each row are connected respectively to the wires 17 and 20. The wires directly connected to the above bus bars are, for convenience, similarly numbered in Figs. 1 and 11. Around the bar magnet is wound an electro-magnet 125, one end of which is grounded on the bar magnet 124 and the other end of which is connected by wire 125ª to wire 92. Each button is also provided with a lead 82ª which is connected to the corresponding wire 82, connected to the adjacent jack.

When it is desired to connect the radio set to a certain station, the proper button or lever, normally raised at its outer end by a spring 121ª, is depressed, whereby the wire 82ª is forced into engagement or electrical contact with the bus bars 122 and 123 and the bar magnet 124. This connection energizes the magnet 31, opening the switch 33, and closing the switches 34, 35 and 36, thereby energizing the set, and also energizing the magnet 73 and attracting its armature. If the button 121 is held, the magnet 73 continues to be energized, causing the motor 4 and the rotary disc 61 to be rotated. This takes place by reason of the connection of the wires 82 and 82ª through the contact 64 with the grounded plate 61. When the insulating strip 63 engages the particular contact 64 (connected to the depressed button or key), the circuit through the magnet 73 is broken, the motor stopped, and the tuning condenser shifted to the desired position.

The bus bar 123 may be eliminated if it is desired to turn the radio on manually through the switch 111.

Instead of manually holding the button or key 121 in a depressed position until the desired station is tuned in, a dashpot may be provided for each button, or the above mentioned holding magnet 125 provided. This magnet 125 is connected, by wire 125ª, to the wire 92, and also to the bar 124; thus the electro-magnet is energized when the button of such magnet is depressed, holding the depressed key.

The operation of the automatic portion of my radio is briefly as follows:

In the drawings, I have shown the variable tuning condenser 1 adjusted to correspond to the position in which the insulating strip 63 engages the contact 64'. Such adjustment is shown as having taken place at 12 o'clock, with the cable 25' connecting the 12 o'clock jack 21a' with the station jack 81'. Assuming the radio set to have been turned off, at 12:15, a circuit will be established, through the wire 17, parts 16, 15, and 14 of time switch or clock D, contact 19'', wire 27'', contact 26'', plate 23, and wire 28, coil 31, switch 33, and wire 38, energizing magnet 31, rocking bar 37, closing switches 34, 35, and 36. The closing of the switches 35 and 36 will cause a direct current to pass through the magnet 73, break the loud speaker circuit, and direct an alternating current through the motor, which will rotate the condenser 1 and the disc 61 of the station finder switch B until the insulating strip 63 engages the contact 64'' connected to the jack 81'' which has been connected by a cable 25'' to a jack 21a'' connected to a contact 18'' designating 12:15 on the clock D. If the radio receiver has not been turned off at 12:15, switch 33 remains open, and the switches 35 and 36 remain closed, permitting only the coil 73 to be energized, the armature 74 to be attracted, the dynamic speaker 3 to be disconnected, and the motor 4 to be operated a predetermined amount. The breaking of the circuit by the insulating strip 63 breaks the circuit through the wire 92 and allows the armature 74 to assume its original off-position. Because the switch 35 is closed, the receiving set is energized and continues to receive a program over the designated broadcast station. When the reception is continued to the predetermined time designated by a cable 43, which connects one of the jacks 42 with the designated jack 21ª connected to the clock, the off-magnet 32 is energized, reversing the condition of the multiple or cooperating switches and returning them to their normal off-positions, which breaks the switch 35 and deenergizes the receiving set.

If it is desired manually to turn on the radio set to a desired station, or manually to change a station previously set by manual or by the automatic means, the desired button 121 on the jack board E² is depressed. This will set in operation the mechanism above described, assuming, of course, that the particular button or jack 81 is connected to or has been previously adjusted so as to be connected to the broadcast station desired. If no contact is located at the desired station position, a contact is first shifted to such location by means of the shiftable blocks 65 shown in Figs. 3 and 4.

The apparatus herein illustrated and described may be constructed or arranged so that the conventional radio receiving set, consisting of elements A, the station finder or selecting switch B and the motor 4, may constitute one unit, while the other elements, consisting of the electromagnetic switch C, the time switch D, the switch or jack board E, and the multiple switch F, may constitute a separate small unit as an accessory to the main receiving set unit.

Figures 11, 12:
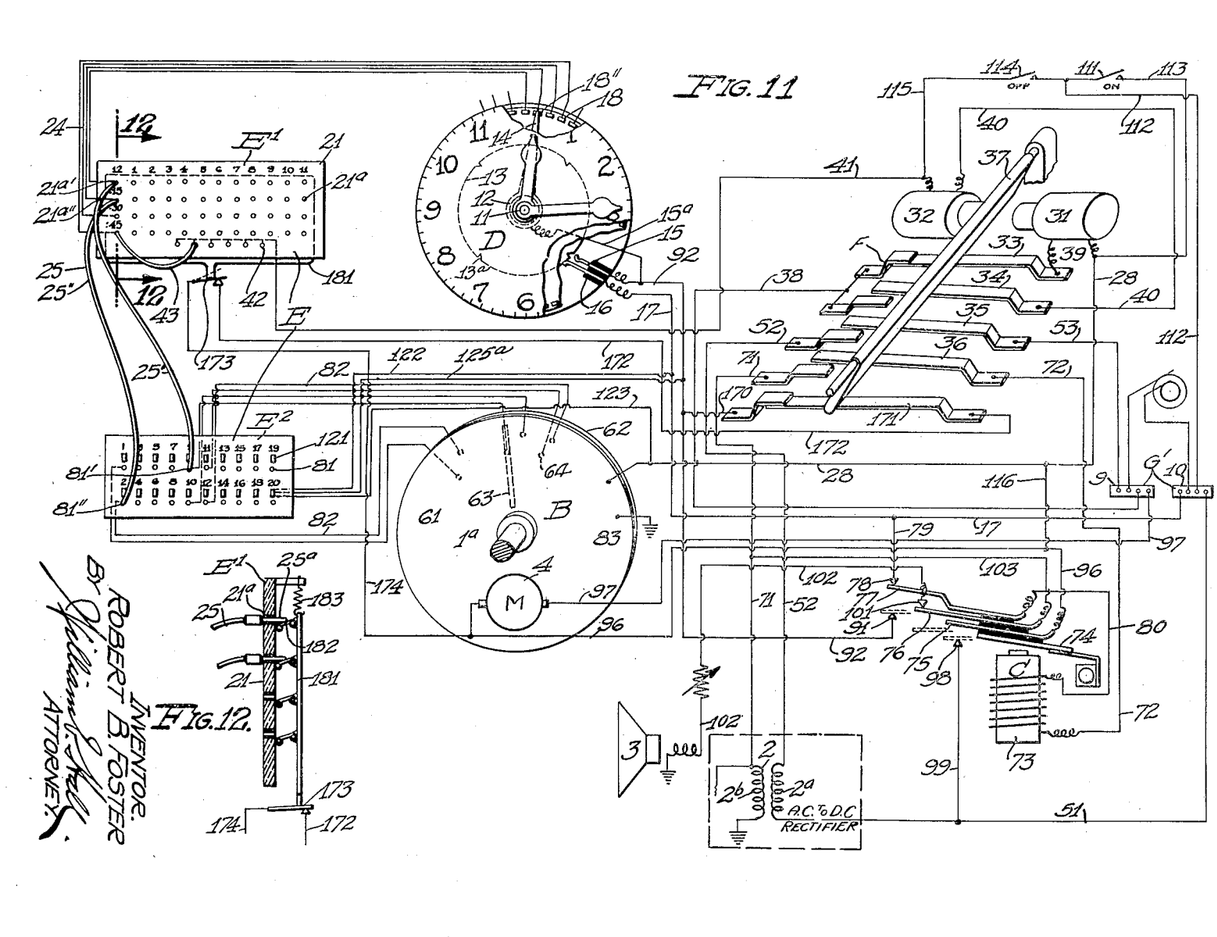
Fig. 11 is a diagrammatic view of a slightly modified form of construction of my apparatus, from that shown in Fig. 1.
Fig. 12 is an enlarged sectional view thereof, taken through 12—12 of Fig. 11.

In the modified apparatus or circuit, shown in Fig. 11, the time control switch D is provided with only one set of contacts 18, and the apparatus is, therefore, simplified, but is so arranged that the motor 4 is jogged or rotated very slightly at 15 minute intervals preceding the first predetermined program, except when the radio receiver is either wholly off, or when a program of more than 15 minute duration is received, and then only if the breaker or insulating strip 63 is on the contact 64 of the desired station. This modification necessitates only a slight reconstruction of the multiple switch F and in the elimination of the contacts 19 on the clock and the elimination of the panels 22 and 23 and the corresponding switches, and the substitution of another switch mechanism, in the time jack or switch board E¹.

The modification of the multiple switch F consists in the addition of a resilient or leaf switch 171 operated simultaneously with the switch 33. One terminal of the switch is connected to the wire 92, and the other terminal is connected by wire 172 to a switch 173 which, when closed, connects the switch 171 by wire 174 to wire 96 which is connected to one terminal of the motor 4, the other terminal of the motor being connected by the wire 97 to the lead 9.

Behind the time switch or jack board E¹, as shown best in Figs. 10 and 12 is a plunger 181, which is pivotally supported on the back of said jack board by a plurality of wings or long plates 182 which are normally inclined upwardly from the back of the jack board. The lower ends of the wings or plates 182 are pivotally mounted on the jack board immediately below each horizontal row of jacks 21ᵃ. The plunger 181 is held in a raised position by a spring 183, which normally holds the switch 173 in an open position. When the plugs 25ᵃ of the cords 25 are inserted into the jacks 21ᵃ, the inner ends of the plugs engage the inclined wings or plates 182 forcing the plunger 181 downwardly and closing the switch 173. It is also noted that the plunger 181 may be forced downwardly by a suitable electromagnet energized when the plugs 25ᵃ are inserted into the jacks 21ᵃ. The energizing circuit for jogging, or slightly operating the motor is as follows: lead 10, wire 17, brush 16, finger 15, wires 92 and 170, switch 171, wire 172, switch 173, wire 174, motor 4, wire 97, lead 9. As soon as the motor 4 is operated, the station-selecting switch is operated, that is, rotated until the brush 16 and finger 15 are separated. This is repeated at 15-minute intervals except during the existent conditions referred to above. Thus, an energizing circuit for the motor is completed when the radio receiver is off (in which switch 171 is closed) and when the brush 16 engages the finger 15 of the clock control switch. But the motor will not function and the switch 173 will be open unless a broadcast station is connected to a time jack. During every 15-minute interval the contact between the brush 16 and the finger 15 will have been broken, and the motor will not be operated until the next 15-minute period.

If such jogging or slight operation takes place at a time when a station jack is connected to the corresponding time jack, a circuit is then immediately established from the finger 15 through wire 15ᵃ, arm 14, contact 13, wire 24, jack 21, cable 25, jack 81, wire 82, disc 62, contacts 64, disc 61, wire 28, magnet 31, switch 33, wire 38, with the lead 9, actuating magnet 31, opening switch 171. This will open the previously established motor circuit, but will operate the motor through the new circuit and rotate the same until the circuit is again broken by the insulating strip 63, when the condenser is turned to receive from the predetermined broadcast station.

Though I have shown and described a particular construction, combination, and arrangement of parts and portions, and a certain modification thereof, I do not wish to be limited to the same, but desire to include in the scope of my invention the construction, combination, and arrangement substantially as set forth in the appended claims.

I claim:

1. In a radio control apparatus, a radio receiver having a tuning condenser, a motor for operating the condenser, a multiple switch for energizing the receiver and for operating the motor, and provided with a magnet for operating the multiple switch, a time switch having spaced contacts for energizing the magnet at predetermined times, and other contacts in connection with and corresponding to the first contacts for operating the motor at said predetermined times.

2. In a radio control apparatus, the combination with a radio receiver having a variable condenser, and a current source, of a multiple electro-magnetically controlled switch mechanism comprising a plurality of cooperating switches, the first being normally closed and the other normally open, an on-magnet for shifting the switches to their reverse positions, said current source being connected through the first switch to the on-magnet, a circuit connecting the receiver to the current source through the other switch, a station selecting switch having spaced contacts and synchronized with the condenser, a motor for operating the condenser and the station-selecting switch and controlled by the latter, a time control switch having a double set of contacts, the contacts of each set being spaced from each other and also insulated from but corresponding to the contacts of the other set, a station and time switch board having station and time jacks corresponding respectively to the contacts of the station-selecting switch and the first set of contacts of the time control switch, and connecting means for variously connecting the time jacks to the station jacks, said board having a switch associated with but insulated from each time jack and each switch connected with one contact of the second set of the time control switch, said connecting means, when connected to a time jack, also connecting the corresponding switch to said on-magnet and thereby energizing the latter at a predetermined time, energizing the receiver and the motor, the corresponding contact of the first set being connected to a contact of the station-selecting switch and thereby predetermining the amount of rotation of the motor.

3. In a radio control apparatus, a radio receiver having a tuning condenser, a motor for operating the condenser, a multiple switch for energizing the receiver and for operating the motor, and provided with a magnet for operating the multiple switch, a time switch having spaced contacts for energizing the magnet at predetermined times, other contacts in connection with and corresponding to the first contacts for operating the motor at said predetermined times, and a station-selecting switch in association with the condenser and operated by the motor for determining the amount of rotation of the latter.

4. In a radio control apparatus, a radio receiver having a tuning condenser, a motor for operating the condenser, a multiple switch for energizing the receiver and for operating the motor, and provided with a magnet for operating the multiple switch, a time switch having spaced contacts for energizing the magnet at predetermined times, other contacts in connection with and corresponding to the first contacts for operating the motor at said predetermined times, a station-selecting switch in association with the condenser and operated by the motor for determining the amount of rotation of the latter, and manually operated buttons for shunting the time control switch when desired.

5. In a radio control apparatus, the combination with a radio receiver having a tuning means, and a current source, of a motor for the tuning means, a station-selecting switch synchronized with the tuning means for normally controlling the motor and operated by the motor, a time control switch having a switch board, means for variously connecting the switch board to the station-selecting switch, a multiple switch mechanism having two switches normally closed and others normally open, a motor operating switch in the circuit with the motor, said time control switch, one of said first switches of the multiple switch mechanism, and said source, and means in association with the switch board for closing said motor operating switch when the connecting means is connected to the switch board, said multiple switch mechanism having an on-magnet, operable, at a time predetermined by the time control switch, through the other of said first switches of the multiple switch mechanism, and adapted to be energized, determinable by the particular connection of the connecting means to the time control switch and after said motor is slightly operated, thereby reversing all switches of said multiple switch mechanism, and opening again said circuit containing said motor operating switch.

6. In a radio control apparatus, the combination with a radio receiver having a tuning means and a current source, of a motor for the tuning means, a station-selecting switch synchronized with the tuning means for normally controlling the motor and operated by the motor, a time control switch having a switch board, means for variously connecting the switch board to the station-selecting switch, a multiple switch mechanism having two switches normally closed and another normally open, a motor operating switch in the circuit with the motor, said time control switch, one of said first switches of the multiple switch mechanism, and said source, and means in association with the switch board for closing said motor operating switch when the connecting means is connected to the switch board, said multiple switch mechanism having an on-magnet, operable, at a time predetermined by the time control switch, through the other of said first switches of the multiple switch mechanism, and adapted to be energized, determinable by the particular connection of the connecting means to the time control switch and after said motor has been slightly operated by said motor operating switch, thereby reversing all switches of said multiple switch mechanism and opening again the circuit containing said motor operating switch, said other switch of the multiple switch mechanism being connected to the radio receiver and adapted to be closed when said switch mechanism is reversed for connecting said receiver to said current source.

7. In a radio control apparatus, the combination with a radio receiver having a tuning means and a current source, of a motor for the tuning means, a station-selecting switch synchronized with the tuning means for normally controlling the motor and operated by the motor, a time control switch having a switch board, means for variously connecting the switch board to the station-selecting switch, an on-switch mechanism having two normally closed switches, a motor operating switch in the circuit with the motor, said time control switch, one of the switches of the on-switch mechanism, and said source, and means in association with the switch board for closing said motor operating switch when the connecting means is connected to the switch board, said on-switch mechanism having an on-magnet, operable, at a time predetermined by the time control switch, through the other of the switches of the on-switch mechanism, and adapted to be energized, determinable by the particular connection of the connecting means to the time control switch and after said motor has been slightly operated by the motor operating switch, thereby opening the switches of the on-switch mechanism.

8. In a radio control apparatus, the combination with a radio receiver having a tuning means and a current source, of a motor for the tuning means, a station-selecting switch synchronized with the tuning means for normally controlling the motor and operated by the motor, a time control switch having a switch board, means for variously connecting the switch board to the station-selecting switch, a multiple switch comprising a normally closed on-switch and a normally open radio receiver operating switch, a motor operating switch in the circuit with the motor, said time control switch, and said source, and means in association with the switch board for closing said motor operating switch when the connecting means is connected to the switch board, said multiple switch having means operable, at a time predetermined by the time control switch, adapted to be actuated, determinable by the particular connection of the connecting means to the time control switch and after said motor has been slightly operated by said motor operating switch, thereby opening said on-switch and closing said radio receiver operating switch.

9. In a control mechanism for an operating apparatus, a current source, a motor for operating the apparatus, a selecting switch synchronized with the apparatus for normally controlling the motor and operated by the motor, a time control switch having a switch board, means for variously connecting the switch board to the selecting switch, a multiple switch mechanism having two switches normally closed and others normally open, a motor operating switch in the circuit with the motor, said time control switch, one of said first switches of the multiple switch mechanism, and said source, and means in association with the switch board for closing said motor operating switch when the connecting means is connected to the switch board, said multiple switch mechanism having an on-magnet, operable, at a time predetermined by the time control switch, through the other of said first switches of the multiple switch mechanism, and adapted to be energized, determinable by the particular connection of the connecting means to the time control switch and after said motor has been slightly operated by the motor operating switch, thereby reversing all switches of said multiple switch mechanism and opening again said circuit containing said motor operating switch.

10. In a control mechanism for an operating apparatus, a current source, a motor for operating the apparatus, a selecting switch synchronized with the apparatus for normally controlling the motor and operated by the motor, a time control switch having a switch board, means for variously connecting the switch board to the selecting switch, a multiple switch mechanism having two switches normally closed and another normally open, a motor operating switch in the circuit with the motor, said time control switch, one of said first switches of the multiple switch mechanism, and said source, and means in association with the switch board for closing said motor operating switch when the connecting means is connected to the switch board, said multiple switch mechanism having an on-magnet, operable, at a time predetermined by the time control switch, through the other of said first switches of the multiple switch mechanism, and adapted to be energized, determinable by the particular connection of the connecting means to the time control switch and after said motor has been slightly operated by the motor operating switch, thereby reversing all switches of said multiple switch mechanism and opening again said circuit containing said motor operating switch, said other switch of the multiple switch mechanism being connected to the apparatus and adapted to be closed when said switch mechanism is reversed for connecting said apparatus to said current source.

11. In a control mechanism for an operating apparatus, a current source, a motor for operating the apparatus, a selecting switch synchronized with the apparatus for normally controlling the motor and operated by the motor, a time control switch having a switch board, means for variously connecting the switch board to the selecting switch, an on-switch mechanism having two normally closed switches, a motor operating switch in the circuit with the motor, said time control switch, one of the switches of the on-switch mechanism, and said source, and means in association with the switch board for closing said motor operating switch when the connecting means is connected to the switch board, said on-switch mechanism having an on-magnet, operable, at a time predetermined by the time control switch, through the other of the switches of the on-switch mechanism, and adapted to be energized, determinable by the particular connection of the connecting means to the time control switch and after said motor has been slightly operated by said motor operating switch, thereby reversing the switches of said on-switch mechanism and opening again said circuit containing said motor operating switch.

12. In a radio control apparatus, the combination with a radio receiver having a variable condenser, and a current source, of a multiple electro-magnetically controlled switch mechanism comprising a plurality of cooperating switches, the first being normally closed and the other normally open, an on-magnet for shifting the switches to their reverse positions, said current source being connected through the first switch to the on-magnet, a circuit connecting the receiver to the current source through the other switch, a station-selecting switch having spaced contacts and synchronized with the condenser, a motor for operating the condenser and the station-selecting switch and controlled by the latter, a time control switch having a double set of contacts, the contacts of each set being spaced from each other and also insulated from, but corresponding to the contacts of the other set, connecting means for variously connecting the contacts of the first set of said time control switch to the contacts of the station-selecting switch, a switch associated with each of the second set of contacts of the time control switch, said connecting means, when connected to one of the contacts of the first set, also connecting the switch, associated with the corresponding contact of the other set, to said on-magnet and thereby energizing the latter at a predetermined time, and energizing the receiver and the motor, the corresponding contact of the first set being connected to a contact of the station-selecting switch and thereby predetermining the amount of rotation of the motor.

13. In a control mechanism for an operating apparatus, a motor for operating the apparatus, a multiple control means for rendering the apparatus operative and for operating the motor and provided with a magnet for operating the control means, a time switch having spaced contacts for energizing the magnet at predetermined times, and other contacts for operating the motor at said predetermined times.

14. In a control mechanism for an operating apparatus, a current source, a multiple electromagnetically controlled switch mechanism comprising a plurality of cooperating switches, the first being normally closed and the other normally open, an on-magnet for shifting the switches to reverse positions, said current source being connected through the first switch to the on-magnet, a circuit connecting the apparatus to the current source through the other switch, a selected switch having spaced contacts and synchronized with the operating apparatus, a motor for operating the apparatus and the selecting switch and controlled by the latter, a time control switch having a double set of contacts, the contacts of each set being spaced from each other and also insulated from, but corresponding to the contacts of the other set, a selecting and time switch board having selecting and time jacks corresponding respectively to the contacts of the selecting switch and the first set of contacts of the time control switch, and connecting means for variously connecting the time jacks to the selecting jacks, said board having a switch associated with, but insulated from each time jack and each switch connected with one contact of the second set of the time control switch, said connecting means, when connected to a time jack, also connecting the corresponding switch to said on-magnet and thereby energizing the latter at a predetermined time, and energizing the apparatus and the motor, the corresponding contact of the first set being connected to a contact of the selecting switch and thereby predetermining the amount of rotation of the motor.

15. In a control mechanism for an operating apparatus, a current source, a multiple electromagnetically controlled switch mechanism comprising a plurality of cooperating switches, the first being normally closed and the other normally open, an on-magnet for shifting the switches to reverse positions, said current source being connected through the first switch to the on-magnet, a circuit connecting the apparatus to the current source through the other switch, a selecting switch having spaced contacts and synchronized with the operating apparatus, a motor for operating the apparatus and the selecting switch and controlled by the latter, a time control switch having a double set of contacts, the contacts of each set being spaced from each other and also insulated from, but corresponding to the contacts of the other set, connecting means for variously connecting the contacts of the first set of said time control switch to the contacts of the selecting switch, a switch associated with each of the second set of contacts of the time control switch, said connecting means, when connected to one of the contacts of the first set, also connecting the switch, associated with the corresponding contact of the other set, to said on-magnet and thereby energizing the latter at a predetermined time, and energizing the apparatus and the motor, the corresponding contact of the first set being connected to a contact of the selecting switch and thereby predetermining the amount of rotation of the motor.

16. In a radio control apparatus, the combination, with a current source, of a multiple electromagnetically controlled switch mechanism comprising a plurality of cooperating switches, the first normally closed and the other normally open, an on-magnet for shifting the switches to their reverse positions in which the first is open and the other closed, the current source connected through the first switch to the on-magnet, a radio receiver, a circuit connecting the receiver to the current source through the other switch, a condenser for the receiver, a station-selecting switch synchronized with the condenser, a motor for operating the condenser and the station-selecting switch, a normally open circuit for the motor, the latter circuit being directly controlled by said station-selecting switch, means in cooperation with the station-selecting switch, for closing, through the latter switch, the circuit to said on-magnet and thereby opening the first switch, closing the other switch, and closing the motor circuit for operating the motor, and manual means, independent of said station-selecting switch, for also closing the circuit to said on-magnet, and thereby opening the first switch and closing the other switch, the latter means being connected in the motor circuit for directly operating the motor.

ROBERT B. FOSTER.